US011989127B2

(12) United States Patent
Benisty (10) Patent No.: US 11,989,127 B2
(45) Date of Patent: May 21, 2024

(54) EFFICIENT L2P DRAM FOR HIGH-CAPACITY DRIVES

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 70 days.

(21) Appl. No.: 17/945,586

(22) Filed: Sep. 15, 2022

(65) Prior Publication Data

US 2024/0095165 A1  Mar. 21, 2024

(51) Int. Cl.
G06F 12/00 (2006.01)
G06F 12/0802 (2016.01)
G06F 12/1027 (2016.01)

(52) U.S. Cl.
CPC ...... *G06F 12/0802* (2013.01); *G06F 12/1027* (2013.01)

(58) Field of Classification Search
CPC ............ G06F 12/0802; G06F 12/1027
See application file for complete search history.

(56) References Cited

U.S. PATENT DOCUMENTS

| 9,552,289 B1 | 1/2017 | Spencer |
| 10,997,085 B2 | 5/2021 | Ogawa et al. |
| 2020/0176066 A1 | 6/2020 | Her et al. |
| 2020/0257820 A1 | 8/2020 | Li |
| 2021/0382818 A1 | 12/2021 | Sharma et al. |
| 2022/0050784 A1* | 2/2022 | Das Purkayastha ........................ G06F 12/0868 |
| 2022/0137871 A1 | 5/2022 | Lin |
| 2022/0156002 A1 | 5/2022 | Kim et al. |
| 2022/0342829 A1* | 10/2022 | Luo ..................... G06F 12/1009 |
| 2023/0045370 A1* | 2/2023 | Wei ....................... G06F 3/0604 |
| 2023/0185712 A1* | 6/2023 | Bolisetty ............... G06F 3/0659 711/206 |

FOREIGN PATENT DOCUMENTS

| CN | 107870867 A | 4/2018 |
| CN | 110597741 A | 12/2019 |
| WO | 2019128200 A1 | 7/2019 |

* cited by examiner

*Primary Examiner* — John A Lane
(74) *Attorney, Agent, or Firm* — PATTERSON + SHERIDAN, LLP (57) ABSTRACT

The present disclosure generally relates to improving space efficiency when storing logical to physical (L2P) entries. Rather than writing a physical block address (PBA) spanning multiple entries, the PBA is split between a first portion stored in the buffer with the remaining bits of the PBA added to the metadata buffer. The metadata buffer is sub-optimal due to the small size of the metadata relative to the entry and therefore, adding extra bits to the metadata buffer will make the metadata buffer more optimal. In this scheme, the alignment is preserved, the system becomes more optimal in terms of DRAM access, and the metadata buffer can be easily optimized and adapted.

20 Claims, 8 Drawing Sheets

EFFICIENT L2P DRAM FOR HIGH-CAPACITY DRIVES

BACKGROUND OF THE DISCLOSURE

Field of the Disclosure

Embodiments of the present disclosure generally relate to improving space efficiency when storing logical to physical (L2P) entries.

Description of the Related Art

A solid-state drive (SSD) stores logical blocks of data on non-volatile (e.g., NAND) media/memory (NVM). The data is provided by a host system which addresses each Logical Block with a logical block address (LBA). For various reasons, such as that the NVM is lost, an SSD must store logical blocks at various physical locations (physical block addresses (PBAs)) on the NVM. The mapping from LBA to the PBA is stored in a table referred to herein as a logical to physical (L2P) table. When the host system reads a particular LBA, the SSD looks up the PBA in the L2P table in order to retrieve the logical block from the NVM and send it to the host system.

L2P tables are large. Enterprise SSDs generally store L2P Tables in dynamic random access memory (DRAM) and attempt to do so as space-efficiently as possible so as to minimize the number of DRAM devices to save cost. The normal ratio is 1000:1 between DRAM and NAND capacity (e.g. a 4 TB drive would have 4 GiB of physical DRAM). However, the 1000:1 ratio is valid only for low-capacity drives when 32-bits are enough for representing a NAND physical address. When the capacity increases, more bits are needed for the physical address and creates un-alignment issues in the physical addresses stored in the double data rate (DDR) device.

Therefore, there is a need in the art for improving space efficiency when storing L2P entries.

SUMMARY OF THE DISCLOSURE

The present disclosure generally relates to improving space efficiency when storing logical to physical (L2P) entries. Rather than writing a physical block address (PBA) spanning multiple entries, the PBA is split between a first portion stored in the buffer with the remaining bits of the PBA added to the metadata buffer. The metadata buffer is sub-optimal due to the small size of the metadata relative to the entry and therefore, adding extra bits to the metadata buffer will make the metadata buffer more optimal. In this scheme, the alignment is preserved, the system becomes more optimal in terms of DRAM access, and the metadata buffer can be easily optimized and adapted.

In one embodiment, a data storage device comprises: a memory device; and a controller coupled to the memory device, wherein the controller is configured to: manage a L2P table comprising 32 L2P entries with each L2P entry comprising 32 bits; and store L2P entries in the L2P table, wherein at least one memory device physical address comprises more than 32 bits, wherein 32 bits of the at least one memory device physical address is stored in a single entry of the 32 L2P entries, and wherein remaining bits of the at least one memory device physical address are stored in a separate location from the L2P table.

In another embodiment, a data storage device comprises: a memory device; and a controller coupled to the memory device, wherein the controller is configured to: determine most significant bits (MSBs) and least significant bits (LSBs) for a physical address of the memory device, wherein the physical address comprises at least 33 bits; store the MSBs in a L2P table; and store the LSBs in a table distinct from the L2P table.

In another embodiment, a data storage device comprises: memory means; and a controller coupled to the memory means, wherein the controller is configured to: identify memory means capacity; determine that double data rate (DDR) is embedded; configure a L2P table to store physical addresses of the memory means, wherein the L2P table comprises entries of 32 bits, wherein the physical addresses comprise more than 32 bits; and configure a metadata table to store remaining bits of the physical addresses with metadata, wherein the metadata table is distinct from the L2P table, and wherein the remaining data corresponds to LSBs of the physical addresses.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to improving space efficiency when storing logical to physical (L2P) entries. Rather than writing a physical block address (PBA) spanning multiple entries, the PBA is split between a first portion stored in the buffer with the remaining bits of the PBA added to the metadata buffer. The metadata buffer is sub-optimal due to the small size of the metadata relative to the entry and therefore, adding extra bits to the metadata buffer will make the metadata buffer more optimal. In this scheme, the alignment is preserved, the system becomes more optimal in terms of DRAM access, and the metadata buffer can be easily optimized and adapted.

The disclosure herein results in the alignment of data in each L2P entry in the DRAM. When the L2P entry is aligned the potential for waste is less. The most significant bits (MSB) of the L2P are stored in the DRAM. While the least significant bits (LSB) are stored in the metadata buffer.

Figure 1:
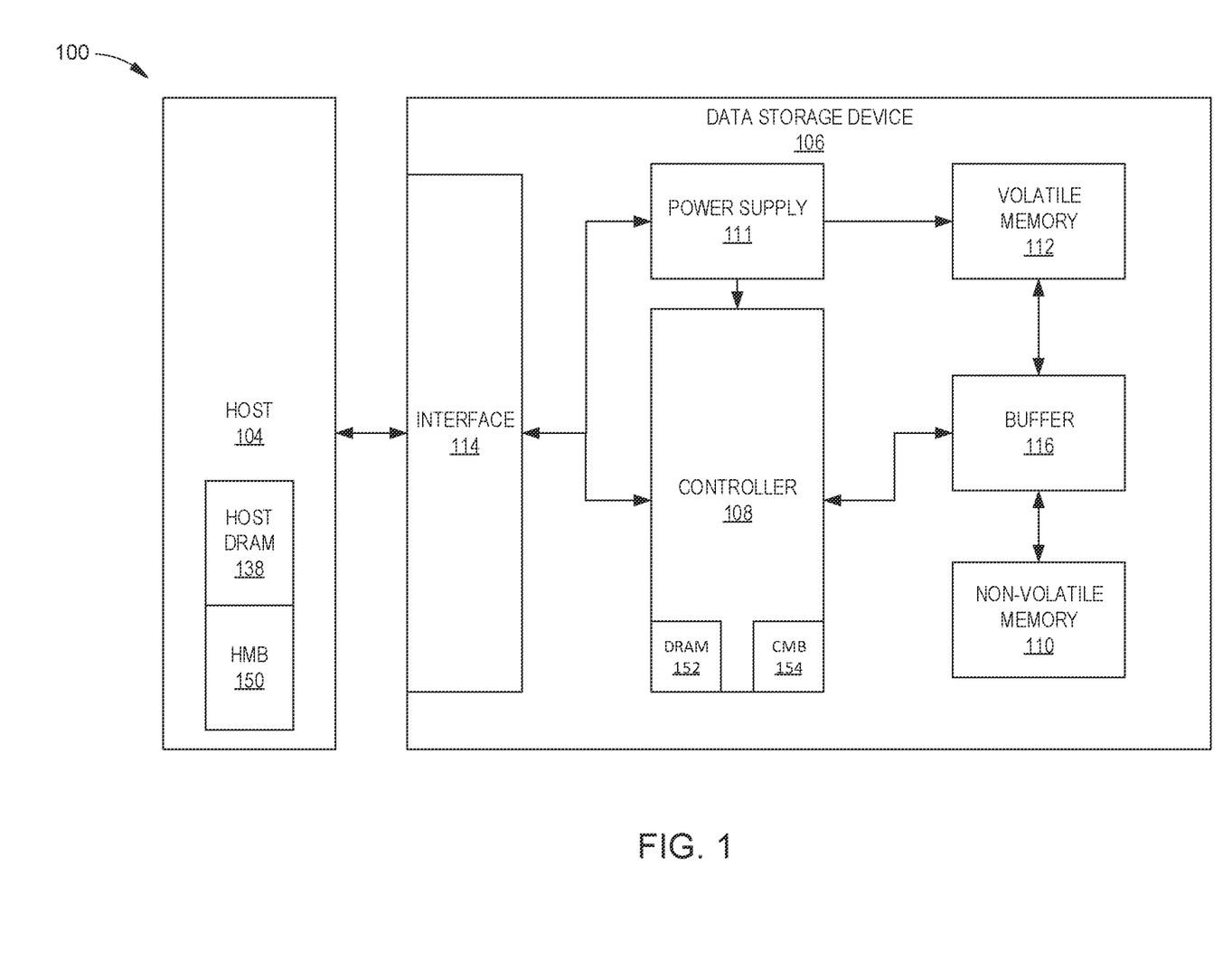
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138 and, optionally, a host memory buffer (HMB) 150. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. The controller 108 may include volatile memory such as DRAM 152 as well as a controller memory buffer (CMB) 154 dedicated for host device 104 usage. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
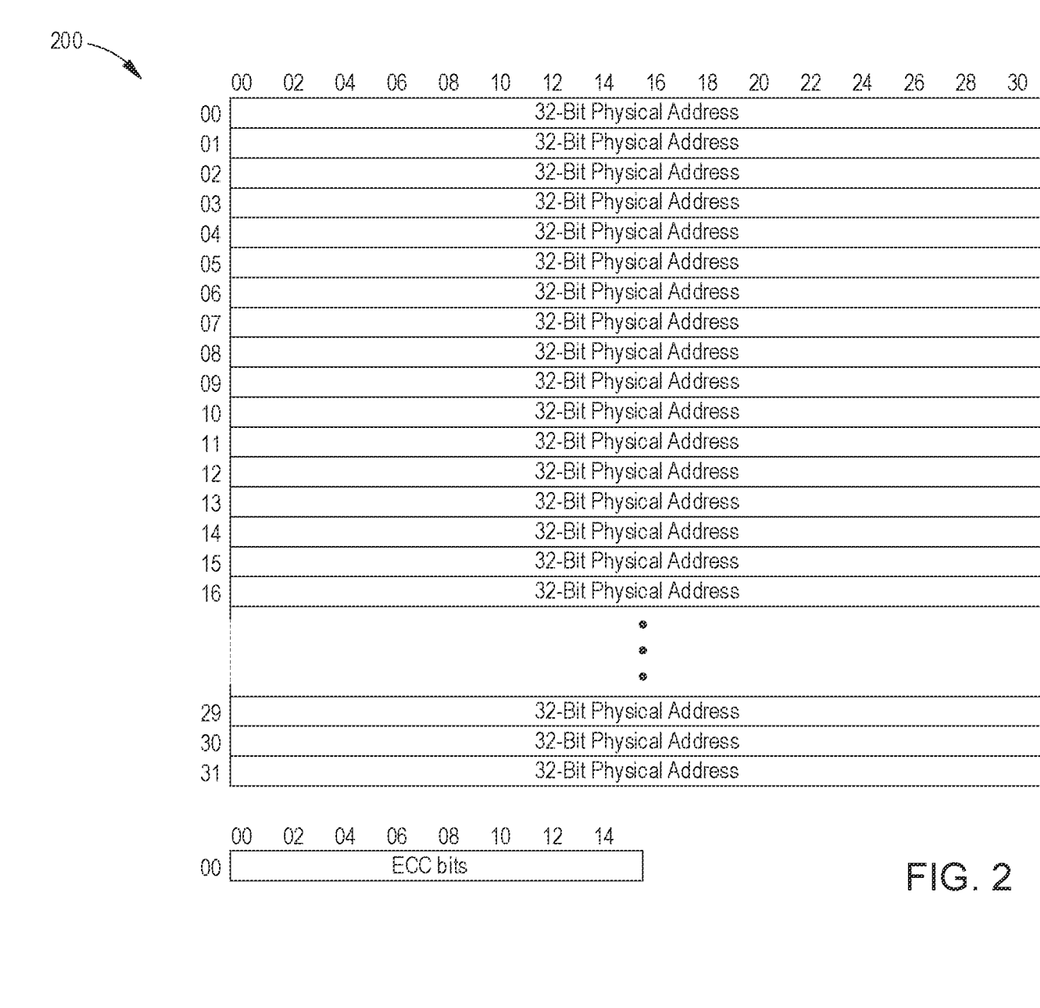
FIG. 2 is a graph illustrating a structure of a logical to physical (L2P) chunk held in dynamic random access memory (DRAM), according to one embodiment.

FIG. 2 is a graph 200 illustrating a structure of L2P chunk held in DRAM, according to one embodiment. The data is structured in double data rate (DDR) popular in client SSDs and enterprise SSD platforms. With the code word, 128 bytes of data are protected by a 2-byte error correction code (ECC). Data and ECC bits are written to two different locations in DRAM. A single word line encapsulates 32-bit L2P entries. When more than 32-bits are needed in each entry, the structure becomes more complex since everything will be unaligned. A L2P entry larger than 32-bits also adds complexity and inconveniency to the firmware (FW).

A maximum of 32-bits per L2P entry is stored in a single word line in DRAM. Up to 8 terabyte (TB) drives at 4 k indirection will allow the storage of 32-bit L2P entries, which is ideal if all L2P entries are 32-bits in size. Currently, 32-bit L2P entries are able to fit in a single word line. This is not the case for L2P entries larger than a 32-bit L2P entry. The larger the L2P entry, the larger the drives will have to be. Up to 16 TB drives at 4 k indirection will allow the storage of 33-bit L2P entries. Additionally, up to 32 TB drives at 4 k indirection will allow the storage of 34-bit L2P entries. Up to 64 TB drives at 4 k indirection will allow the storage of 35-bit L2P entries. Furthermore, up to 128 TB drives at 4 k indirection will allow the storage of 36-bit L2P entries. In previous approaches, a L2P entry larger than 32-bits will be written to multiple lines of the code word in the DRAM.

Figure 3:
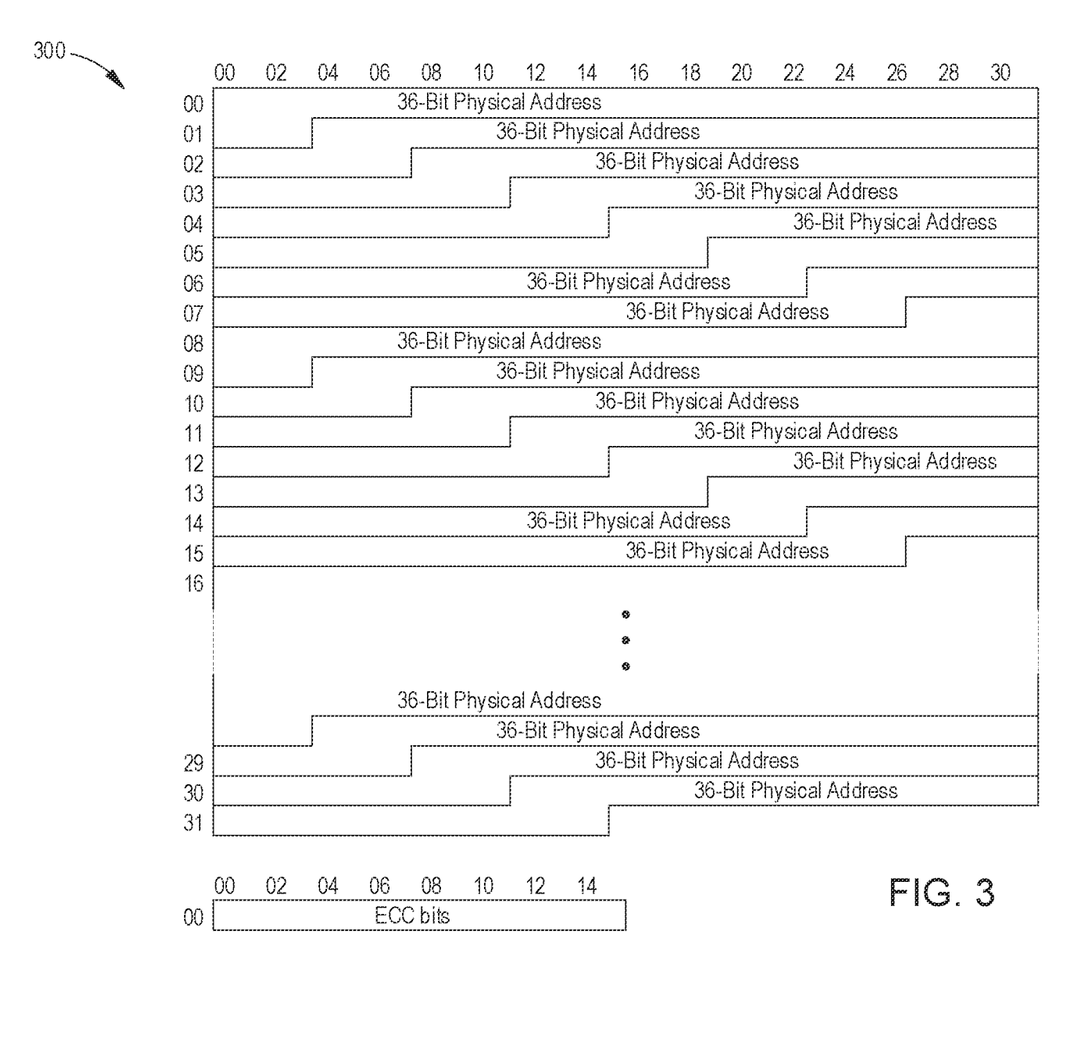
FIG. 3 is a graph illustrating a structure of a L2P chunk held in DRAM, according to another embodiment.

FIG. 3 is a graph 300 illustrating a structure of a L2P chunk held in DRAM, according to one embodiment. When 36-bit L2P entries are needed for the physical address (128 TB 4K indirection drive), the entries carry over into multiple lines. As shown, only 28 physical addresses can be stored in the code word while having a waste of 2-bytes. Since the 36-bit L2P entries are consecutive, each entry will be written to at least two word lines. Reading multiple word lines is inefficient use of the DRAM. Writing a L2P larger than 32-bits to multiple word lines causes un-alignment in the DRAM. Furthermore, whole entries always start in a different word line from where the entry finishes. There is a waste of several bytes each time an L2P is written to multiple word lines. The waste reduces the net capacity of the DRAM. A result is less physical addresses are able to be stored in one chunk of the DRAM. The use of multiple word lines should be avoided.

Figure 4:
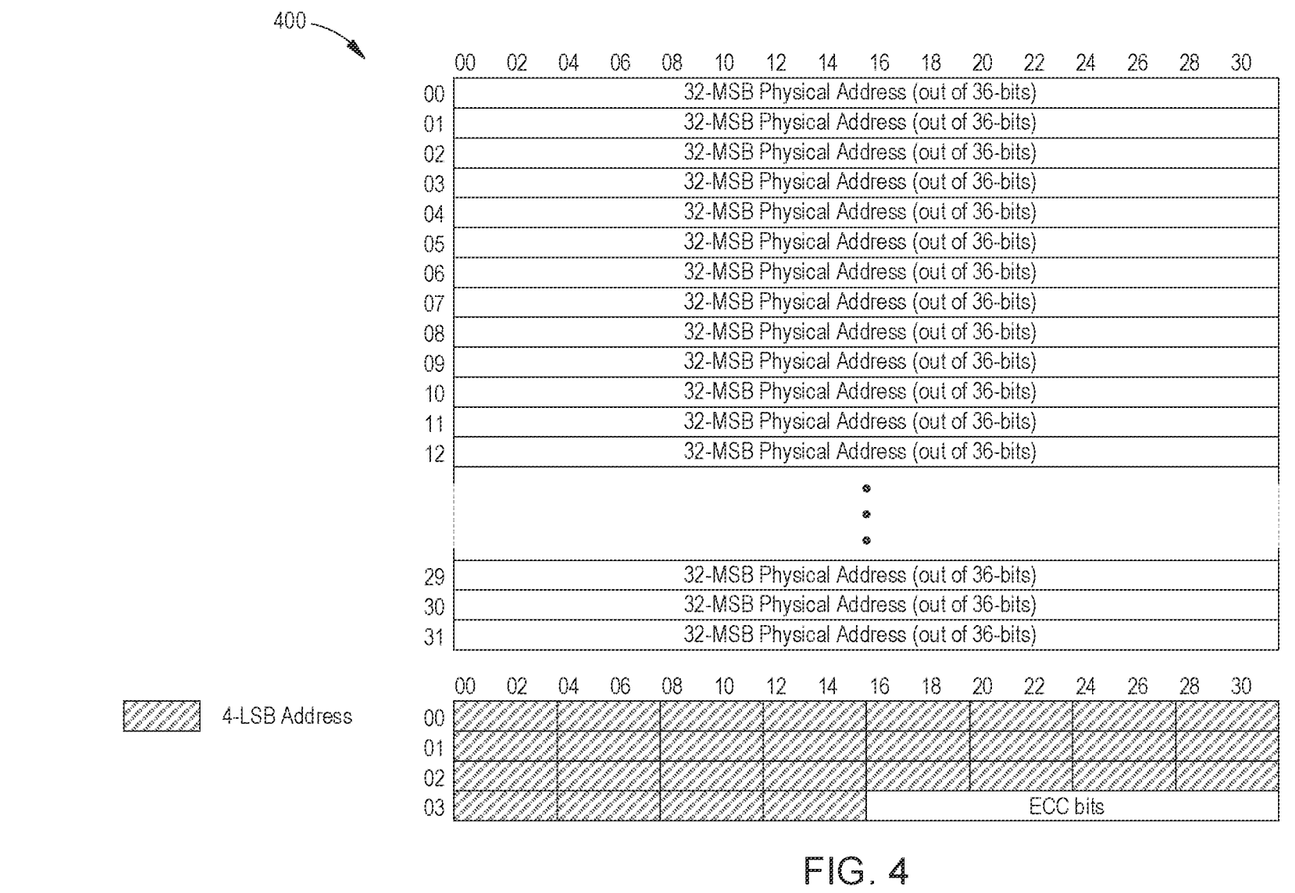
FIG. 4 is a graph illustrating a structure of a L2P chunk held in DRAM, according to another embodiment.

FIG. 4 is a graph 400 illustrating a structure of a L2P chunk held in DRAM, according to one embodiment. In the previous approach, when 36-bit L2P entries are needed for the physical address (128 TB 4K indirection drive) the entries carry over into multiple lines. As shown in FIG. 4, 32-bit L2P entries are still being held in the DRAM structure while each entry starts at the same location and are in alignment. The DRAM holds the 32 most significant bits (MSBs) of each physical addresses in consecutive single word lines while the metadata buffer holds the remaining 4 bits per entry. The remaining 4 bits are the least significant bits (LSBs) of the entries. The size of the metadata buffer depends on the maximum NVM capacity supported by the device. In this example, the size of the metadata is 16-bytes holding the 4 LSBs of each physical address and the ECC bits. The 4 LSBs are what is left from each 36-bit L2P entry. A 16-byte metadata buffer size is much more optimal than the original 2 byte metadata buffer and can store the LSBs.

As each 36-bit L2P entry is read, only 32 MSBs are stored in the DRAM per physical address are read as well as the 4 LSBs in the metadata. Hence, a read will proceed by reading one entry from the DRAM buffer and one entry from the metadata buffer to collectively obtain the 36 bits. Another entry in the metadata buffer may need to be read if the ECC bits for the entry from the DRAM is located in a different entry of the metadata buffer. If all 36 bits were stored in the DRAM buffer, then the read would occur by reading two entries of the DRAM buffer as well as one entry of the metadata buffer for the ECC information. With the split between MSB and LSB in the DRAM buffer and metadata buffer, the total entries to be read may still be three entries if the ECC and LSBs are in different entries, but will only be two entries if the ECC and LSB are in the same entry. Furthermore, the entries in the DRAM buffer are all aligned, and the metadata buffer is aligned as well. Hence, both the DRAM buffer and the metadata buffer are optimized for efficient data storage and retrieval.

Figure 5:
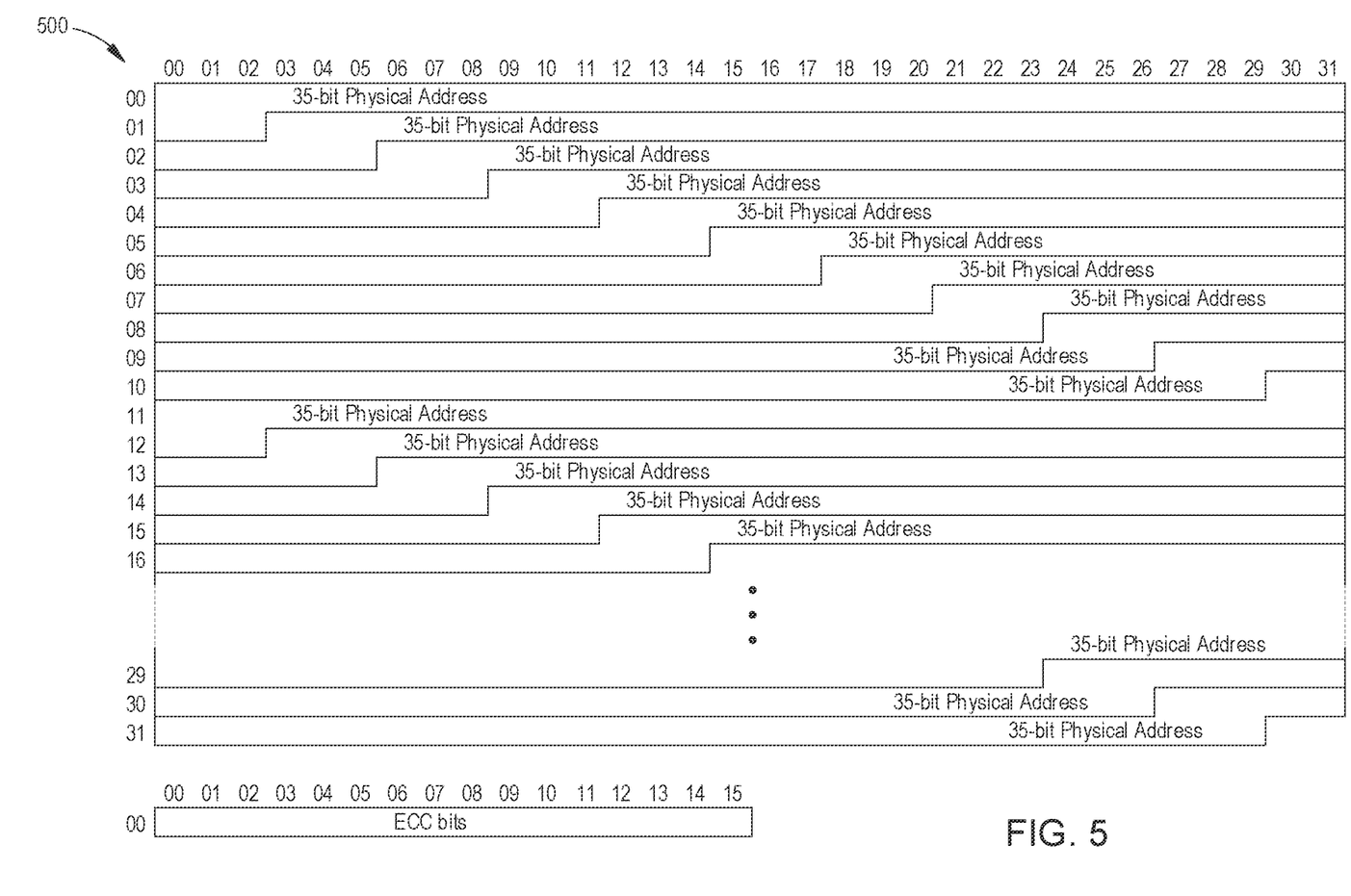
FIG. 5 is a graph illustrating a structure of a L2P chunk held in DRAM, according to another embodiment.

FIG. 5 is a graph 500 illustrating a structure of a L2P chunk held in DRAM, according to one embodiment. When 35-bit L2P entries are needed for the physical address (64 TB 4K indirection drive) the entries carry over into multiple lines. As can be shown, only 29 physical addresses can be stored in the code word while having a waste of 9-bytes. Since the 35-bit L2P entries are consecutive, each entry will be written to at least two word lines. Reading multiple word lines is inefficient use of the DRAM. Writing a L2P larger than 32-bits to multiple word lines causes un-alignment in the DRAM. Furthermore, whole entries always start in a different word line from where the entry ends. There is a waste of several bytes each time an L2P is written to multiple word lines. The waste reduces the net capacity of the DRAM. A result is less physical addresses are able to be stored in one chunk of the DRAM. The use of multiple word lines can be avoided.

Figure 6:
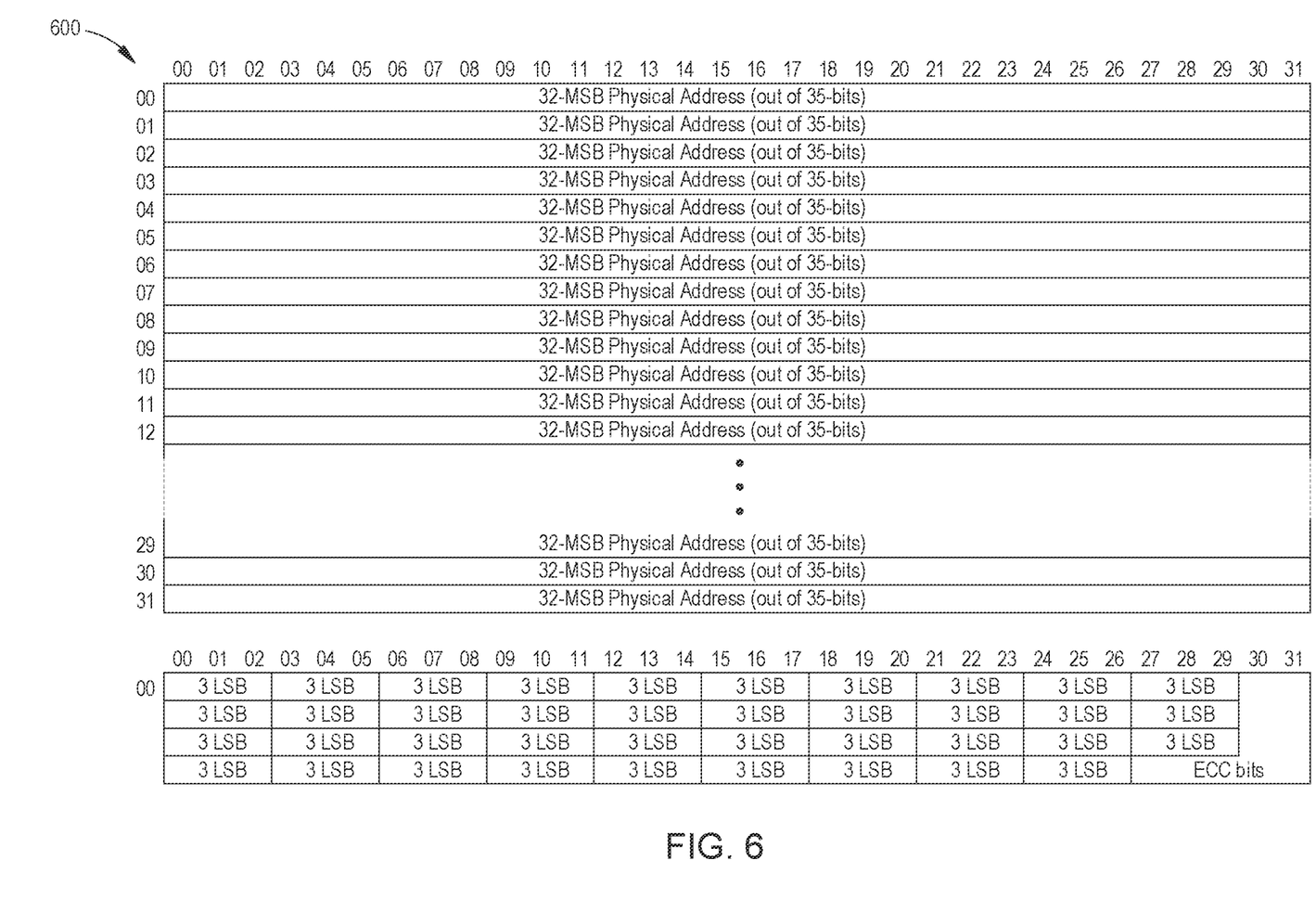
FIG. 6 is a graph illustrating a structure of a L2P chunk held in DRAM, according to another embodiment.

FIG. 6 is a graph 600 illustrating a structure of a L2P chunk held in DRAM, according to one embodiment. In this example a better approach for FIG. 5 is shown. In previous approach, when 35-bit L2P entries are needed for the physical address (64 TB 4K indirection drive), the entries carry over into multiple lines. As shown in FIG. 6, 32-bit L2P entries are still being held in the DRAM structure while each entry starts at the same location and are in alignment. The DRAM holds the 32 MSBs of each physical address in consecutive single word lines while the metadata buffer holds the remaining 4 bits per entry. The remaining 4 bits are the least significant bits (LSBs) of the entries. The size of the metadata buffer depends on the maximum NVM capacity supported by the device. In this example, the size of the metadata is 12-bytes holding the 3 LSBs of each physical address and the ECC bits. The 3 LSBs are what is left from each 35-bit L2P entry. A 12-byte metadata buffer size is much more optimal than the original 2 byte metadata buffer and can store the LSBs.

As each 35-bit L2P entry is read, only 32 MSB's are stored in the DRAM per physical address are read as well as the 3 LSBs in the metadata. Hence, a read will proceed by reading one entry from the DRAM buffer and one entry from the metadata buffer to collectively obtain the 35 bits. Another entry in the metadata buffer may need to be read if the ECC bits for the entry from the DRAM is located in a different entry of the metadata buffer. If all 35 bits were stored in the DRAM buffer, then the read would occur by reading two entries of the DRAM buffer as well as one entry of the metadata buffer for the ECC information. With the split between MSB and LSB in the DRAM buffer and metadata buffer, the total entries to be read may still be three entries if the ECC and LSBs are in different entries, but will only be two entries if the ECC and LSB are in the same entry. Furthermore, the entries in the DRAM buffer are all aligned, and the metadata buffer is aligned as well. Hence, both the DRAM buffer and the metadata buffer are optimized for efficient data storage and retrieval.

Figure 7:
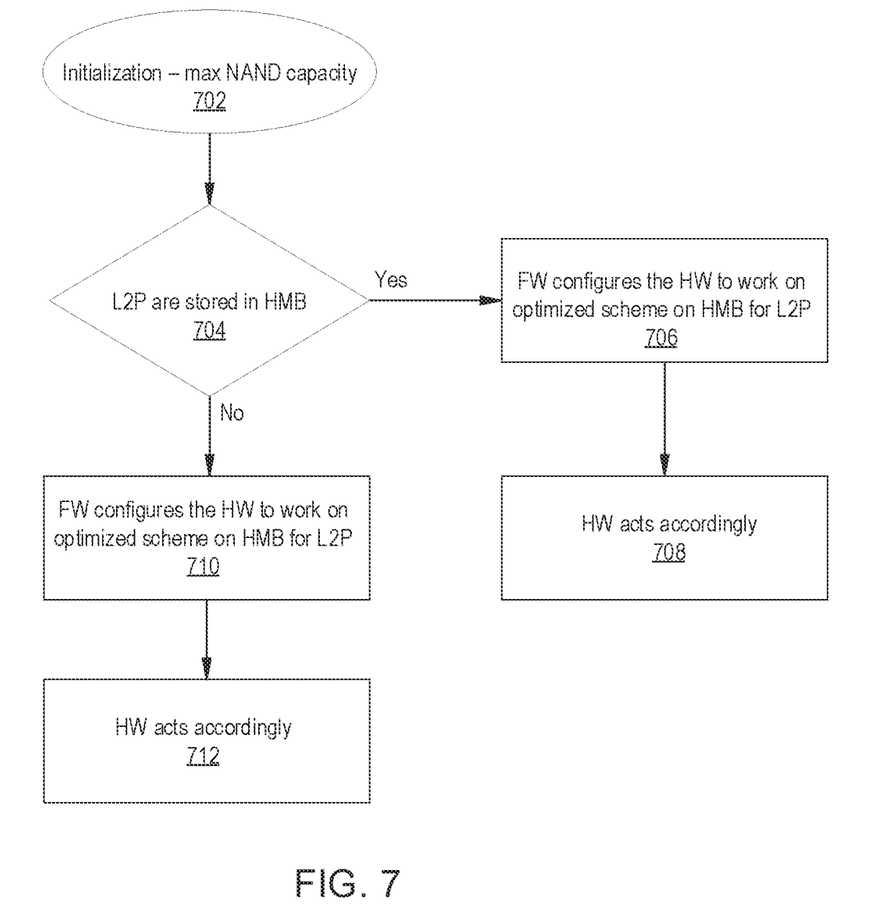
FIG. 7 is a flow chart illustrating L2P in DRAM, according to certain embodiments.

FIG. 7 is a flow chart 700 illustrating L2P in DRAM, according to certain embodiments. At the initialization phase, the firmware (FW) identifies the maximum capacity supported by the product (function of number of dies, etc.). Then, if the internal DDR is embedded, the FW configures the system to work on a specific and optimized mode. The optimized mode will determine where to store each L2P entry within the structure of data and metadata buffers. The same concept applies for the HMB when used for storing L2P entries.

In operation 702, the system enters an initialization process to determine the max NVM (i.e., NAND) capacity. The max NAND capacity will determine how many L2P entries can be written to the DDR.

In operation 704, the system determines whether the potential L2P entries are stored in the HMB. The determination of where the L2P entries are stored will lead to the same result whether the L2P entries are stored in the HMB or not. The system will begin determining the optimized scheme to implement for the L2P entries.

In operation 706, the FW configures the HW to work on an optimized scheme on the HMB for the L2P entries. The scheme will determine the number of bits the L2P entries have. The system will then determine the number of MSBs to be stored in the DDR. The system will also determine the number of LSBs to be stored in the metadata buffer with the ECC bits.

In operation 708, the system proceeds to store the 32 MSBs of the L2P entries. The system will also store the remaining bits or LSBs of the L2P entries to the metadata buffer along with the ECC bits. The metadata buffer will be larger than the normal 2-byte buffer, if the L2P entries are larger than 32-bits.

In operation 710, the FW configures the HW to work on an optimized scheme on the HMB for the L2P entries. The scheme will determine the number of bits the L2P entries have. The system will then determine the number of MSBs to be stored in the DDR. The system will also determine the number of LSBs to be stored in the metadata buffer with the ECC bits.

In operation 712, the system proceeds to store the 32 MSB of the L2P entries. The system will also store the remaining bits or LSBs of the L2P entries to the metadata buffer along with the ECC bits. The metadata buffer will be larger than the normal 2-byte buffer, if the L2P entries are larger than 32-bits.

Figure 8:
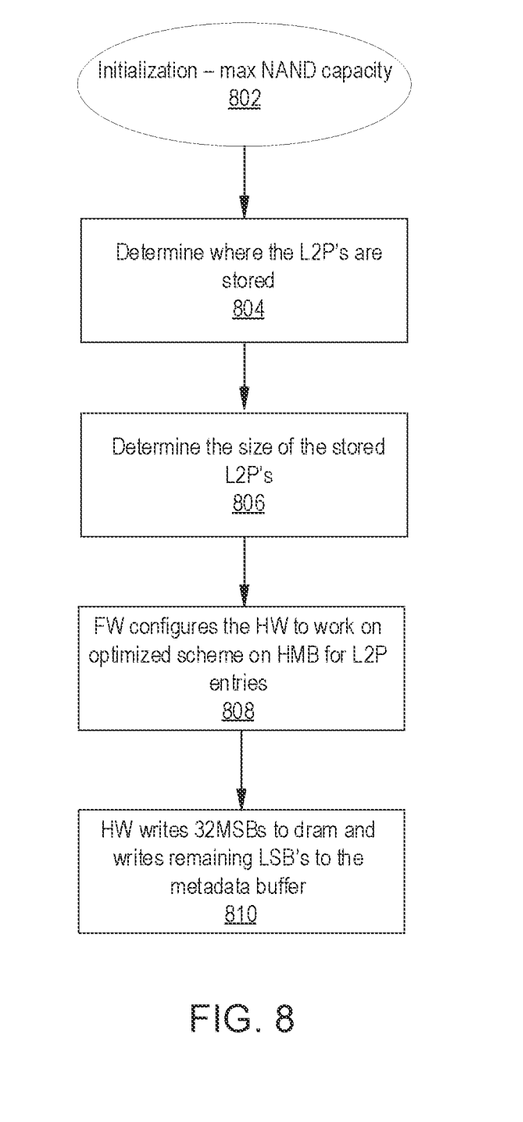
FIG. 8 is a flow chart illustrating L2P in DRAM, according to certain embodiments.

FIG. 8 is a flow chart 800 illustrating L2P in DRAM, according to certain embodiments. At block 802, initialization occurs and the maximum NVM (e.g., NAND) capacity is determined. Next, at block 804, the location of where the L2P table will be stored is determined. For example, the L2P table may be stored in the controller volatile memory or the HMB. Next, at block 806, the size of the L2P table is determined followed by the FW configuring the HW to work on an optimized scheme for the L2P entries at 808. Finally, the HW writes the 32 MSBs to DRAM and the remaining LSBs to the metadata buffer at 810.

In one embodiment, a data storage device comprises: a memory device; and a controller coupled to the memory device, wherein the controller is configured to: manage a logical to physical (L2P) table comprising 32 L2P entries with each L2P entry comprising 32 bits; and store L2P entries in the L2P table, wherein at least one memory device physical address comprises more than 32 bits, wherein 32 bits of the at least one memory device physical address is stored in a single entry of the 32 L2P entries, and wherein remaining bits of the at least one memory device physical address are stored in a separate location from the L2P table. The separate location is an error correction code (ECC) table. The ECC table comprises at least one entry, wherein the at least one entry is 32 bits, and wherein the at least one entry comprises ECC data and the remaining bits. The at least one entry comprises a first entry and a second entry and wherein the first entry comprises the remaining bits and the second entry comprises at least a portion of the ECC data. The first entry comprises at least another portion of the ECC data. The 32 bits of the at least one memory device physical address as the most significant bits (MSBs) of the more than 32 bits. The remaining bits of the more than 32 bits of the at least one memory device are the least significant bits (LSBs) of the more than 32 bits. The L2P table is disposed in host memory buffer (HMB). The L2P table is disposed in the controller. The remaining bits comprise one or more bits. The separate location is not a L2P entry directly adjacent to the single entry.

In another embodiment, a data storage device comprises: a memory device; and a controller coupled to the memory device, wherein the controller is configured to: determine most significant bits (MSBs) and least significant bits (LSBs) for a physical address of the memory device, wherein the physical address comprises at least 33 bits; store the MSBs in a logical to physical (L2P) table; and store the LSBs in a table distinct from the L2P table. The MSBs are stored as a single entry in the L2P table. The LSBs are stored in a table with error correction code (ECC) data. The table distinct from the L2P table is less than one quarter a size of the L2P table. Entries in the table distinct from the L2P table comprise 32 bits. The MSBs comprise 32 bits.

In another embodiment, a data storage device comprises: memory means; and a controller coupled to the memory means, wherein the controller is configured to: identify memory means capacity; determine that double data rate (DDR) is embedded; configure a logical to physical (L2P) table to store physical addresses of the memory means, wherein the L2P table comprises entries of 32 bits, wherein the physical addresses comprise more than 32 bits; and configure a metadata table to store remaining bits of the physical addresses with metadata, wherein the metadata table is distinct from the L2P table, and wherein the remaining data corresponds to least significant bits (LSBs) of the physical addresses. The controller is configured to determine whether the L2P table is stored in a host memory buffer (HMB) or in the data storage device. When the L2P table is stored in the data storage device, the L2P table is stored in DRAM in the controller.

As discussed herein, the efficient use of DRAM capacity while minimizing as much as possible waste due to un-alignment is obtained. Another advantage can be measured in DRAM performance by issuing optimized transactions on DRAM. Storing the 32 MSBs to a single word line, while storing the remaining LSB's to the metadata buffer improves L2P storage efficiency.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
   manage a logical to physical (L2P) table comprising 32 L2P entries with each L2P entry comprising 32 bits; and
   store L2P entries in the L2P table, wherein at least one memory device physical address comprises more than 32 bits, wherein 32 bits of the at least one memory device physical address is stored in a single entry of the 32 L2P entries, and wherein remaining bits of the at least one memory device physical address are stored in a separate location from the L2P table.

2. The data storage device of claim 1, wherein the separate location is an error correction code (ECC) table.

3. The data storage device of claim 2, wherein the ECC table comprises at least one entry, wherein the at least one entry is 32 bits, and wherein the at least one entry comprises ECC data and the remaining bits.

4. The data storage device of claim 3, wherein the at least one entry comprises a first entry and a second entry and wherein the first entry comprises the remaining bits and the second entry comprises at least a portion of the ECC data.

5. The data storage device of claim 4, wherein the first entry comprises at least another portion of the ECC data.

6. The data storage device of claim 1, wherein the 32 bits of the at least one memory device physical address as the most significant bits (MSBs) of the more than 32 bits.

7. The data storage device of claim 1, wherein the remaining bits of the more than 32 bits of the at least one memory device are the least significant bits (LSBs) of the more than 32 bits.

8. The data storage device of claim 1, wherein the L2P table is disposed in host memory buffer (HMB).

9. The data storage device of claim 1, wherein the L2P table is disposed in the controller.

10. The data storage device of claim 1, wherein the remaining bits comprise one or more bits.

11. The data storage device of claim 1, wherein the separate location is not a L2P entry directly adjacent to the single entry.

12. A data storage device, comprising:
    a memory device; and
    a controller coupled to the memory device, wherein the controller is configured to:
    determine most significant bits (MSBs) and least significant bits (LSBs) for a physical address of the memory device, wherein the physical address comprises at least 33 bits;
    store the MSBs in a logical to physical (L2P) table; and
    store the LSBs in a table distinct from the L2P table.

13. The data storage device of claim 12, wherein the MSBs are stored as a single entry in the L2P table.

14. The data storage device of claim 12, wherein the LSBs are stored in a table with error correction code (ECC) data.

15. The data storage device of claim 12, wherein the table distinct from the L2P table is less than one quarter a size of the L2P table.

16. The data storage device of claim 15, wherein entries in the table distinct from the L2P table comprise 32 bits.

17. The data storage device of claim 16, wherein the MSBs comprise 32 bits.

18. A data storage device, comprising:
    memory means; and
    a controller coupled to the memory means, wherein the controller is configured to:
    identify memory means capacity;
    determine that double data rate (DDR) is embedded;
    configure a logical to physical (L2P) table to store physical addresses of the memory means, wherein the L2P table comprises entries of 32 bits, wherein the physical addresses comprise more than 32 bits; and
    configure a metadata table to store remaining bits of the physical addresses with metadata, wherein the metadata table is distinct from the L2P table, and wherein the remaining data corresponds to least significant bits (LSBs) of the physical addresses.

19. The data storage device of claim 18, wherein the controller is configured to determine whether the L2P table is stored in a host memory buffer (HMB) or in the data storage device.

20. The data storage device of claim 19, wherein when the L2P table is stored in the data storage device, the L2P table is stored in DRAM in the controller.

* * * * *